United States Patent
Wang et al.

(10) Patent No.: US 7,226,218 B2
(45) Date of Patent: Jun. 5, 2007

(54) METHOD AND APPARATUS FOR COUPLING A LASER TO A FIBER IN A TWO-LENS LASER SYSTEM

(75) Inventors: Chung-Yung Wang, Sugar Land, TX (US); Hung-Lun Chang, Sugar Land, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 288 days.

(21) Appl. No.: 10/938,974

(22) Filed: Sep. 10, 2004

(65) Prior Publication Data

US 2006/0056777 A1    Mar. 16, 2006

(51) Int. Cl.
*G02B 6/36* (2006.01)
(52) U.S. Cl. .............. 385/91; 385/88; 385/90; 385/92; 385/93; 385/94; 372/36
(58) Field of Classification Search .......... 385/91, 385/90, 92; 372/36
See application file for complete search history.

(56) References Cited

U.S. PATENT DOCUMENTS

| | | | |
|---|---|---|---|
| 5,195,155 A * | 3/1993 | Shimaoka et al. | 385/90 |
| 5,345,373 A | 9/1994 | Tanida | |
| 5,745,625 A * | 4/1998 | Aikiyo et al. | 385/94 |
| 5,751,877 A | 5/1998 | Ishizaka et al. | |
| 5,993,073 A | 11/1999 | Hamakawa et al. | |
| 6,010,251 A | 1/2000 | Koyanagi et al. | |
| 6,364,543 B1 * | 4/2002 | Fairchild et al. | 385/92 |
| 6,742,938 B2 | 6/2004 | Tanaka et al. | |
| 6,786,627 B2 | 9/2004 | Takagi et al. | |
| 6,792,012 B2 * | 9/2004 | Wolak et al. | 372/29.02 |
| 2002/0090015 A1 | 7/2002 | Nakajima et al. | |

FOREIGN PATENT DOCUMENTS

JP    411097964 A    4/1999

* cited by examiner

*Primary Examiner*—Frank G. Font
*Assistant Examiner*—James P. Hughes
(74) *Attorney, Agent, or Firm*—N. Stephan Kinsella; Grossman, Tucker, Perreault & Pfleger

(57) ABSTRACT

A laser module having a laser optically coupled with an optical fiber via a collimating lens and a focusing lens is formed. The laser is mounted in a laser housing so that its laser light output is directed toward a laser housing wall opening in a laser housing wall of the laser housing. A lens-fiber housing having a lens installed in a first end thereof and a light-receiving input end of the fiber disposed in a bore at a second end thereof is provided. The lens and input end of the fiber form a collimator. The lens-fiber housing is mounted from the outside of the laser housing to the laser housing wall to receive collimated light transmitted from inside the laser housing through the laser housing wall opening. The collimating lens is actively aligned in the laser housing, between the laser and the laser housing wall opening, to determine an aligned position. The collimating lens is secured in the laser housing at the aligned position.

16 Claims, 4 Drawing Sheets

METHOD AND APPARATUS FOR COUPLING A LASER TO A FIBER IN A TWO-LENS LASER SYSTEM

CROSS-REFERENCES TO RELATED APPLICATIONS

This application is related in subject matter to U.S. patent application Ser. No. 10/938,996, filed on Sep. 10, 2004 (now abandoned) and entitled "Laser Module with Improved Lens Housing and Associated Methods" (inventors Chung-Yung Wang and Hung-Lun Chang).

BACKGROUND OF THE INVENTION

1. Field of the Invention

This invention relates to laser packaging and, in particular, to apparatuses and methods for optically coupling optical fibers to semiconductor lasers.

2. Description of the Related Art

The following descriptions and examples are not admitted to be prior art by virtue of their inclusion within this section.

There are several types of lasers, including gas lasers, solid-state lasers, liquid (dye) lasers, free electron, and semiconductor lasers. All lasers have a laser cavity defined by at least two laser cavity mirrors, and an optical gain medium in the laser cavity. The gain medium amplifies electromagnetic waves (light) in the cavity by stimulated emission, thereby providing optical gain.

In semiconductor lasers, a semiconductor active region serves as the gain medium. Semiconductor lasers may be edge-emitting lasers or surface-emitting lasers (SELs). Edge-emitting semiconductor lasers output their radiation parallel to the wafer surface, in contrast to SELs, in which the radiation output is perpendicular to the wafer surface, as the name implies.

Semiconductor lasers are used in a variety of applications, such as high-bit-rate optical fiber communications. In telecommunications applications, the laser often emits at a single lasing wavelength at 1.31 µm (and other closely spaced wavelengths), or at telecommunications wavelengths specified by the ITU grid, such as lasing wavelengths of 1.55 µm (and other closely spaced wavelengths). These wavelength ranges are often used for telecommunications purposes because the loss of silica fibers is comparatively low at these wavelengths.

Lasers must be optically coupled to fibers to engage in optical fiber communications. For example, a 1.31 µm edge-emitting laser's output must be optically coupled into the input (light-receiving) end of an optical fiber in order to transmit a modulated optical signal via the fiber.

Various modules, assemblies or packages are used to hold the laser, other optical components (such as collimation and coupling lenses, isolators, and the like), and optical fiber while being aligned with each other so as to permit the laser to be optically coupled to the fiber, i.e. light output from the laser is transmitted into the fiber. The process of aligning an optical fiber to a laser diode and fixing it in place is sometimes known as fiber pigtailing.

Optoelectronics packaging is one of the most difficult and costly operations in optoelectronics manufacturing. It can be difficult, expensive, and time-consuming to accurately align the laser diode with the optical fiber, i.e. to properly couple the laser to the fiber, so that a sufficient amount of laser light output by the laser is coupled into the fiber. The alignment must take into account any intermediate optical components such as one or more lenses, isolators, and the like.

In a one-lens system, a focusing lens is mounted between the laser and input end of the fiber to which it is to be coupled. In a two-lens system, the laser emits into a collimating lens, and the collimated light is directed into the focusing lens, and then into the fiber (the focusing lens plus fiber input end form a collimator).

In the prior art, various laser packages (housings) are employed to align and position the laser, fiber, and related optical components to each other so the laser is optically coupled to the fiber. The standard laser package housing types include TO (transistor outline) can and butterfly packages.

For example, the laser (usually a laser diode) and the light-receiving end of the optical fiber to which the laser is to be optically coupled may be mounted together in a TO can housing. The laser is mounted on a laser submount on the TO can post of the TO header. The fiber end may be disposed in a rigid cylindrical ferrule, which is itself mounted inside a cylindrical ferrule housing. The TO header has a substantially cylindrical portion having a lens disposed in an opening in the top portion thereof, in the TO cap, which can be disposed between the laser and the fiber end. After the fiber is actively aligned to the laser, the alignment process is completed by mounting the fiber ferrule housing to the TO can housing by a variety of techniques such as laser welding, or by using an appropriate adhesive such as epoxy or glue. The TO header itself has a disc-like flange section extending from the bottom of its cylindrical portion, with a circular ridge on the bottom of the flange, which is used to secure and seal the TO header to the base of the TO can housing by resistance welding.

In metal boxlike housings (packages) such as butterfly housings, the laser and related components are mounted on a platform such as an optical bench. The optical bench may be mounted on a cooling means comprising a heat radiating element such as a Peltier effect element, i.e. a thermoelectric cooler, or TEC, inside the boxlike housing. In one approach, there is an opening in an end sidewall of the housing, through which is inserted a metal pipe (ferrule). The fiber is inserted through the ferrule into the inside of the housing, and soldered to the metal ferrule for a sealed fit. Disposed on the platform between the laser and the input end of the fiber are typically components such as collimating lens, isolator, and one or more lenses.

In a two-lens system, both a collimating lens and a collimator (focusing lens plus fiber input end) are employed. In such a system a diode laser chip on submount is typically mounted onto an optical bench in a metal butterfly housing. The butterfly housing is to be hermetically sealed and will contain the laser and associated optics. The optical bench may itself be mounted on a TEC inside the laser housing. Next, a temporary alignment collimator is mounted on a glass window, for use in actively aligning the collimating lens. The collimating lens is positioned with alignment equipment between the laser and the housing window, and is actively aligned until adequate output light is output by the collimator. The collimating lens is then fixed in position by means of a clip which permits x, y, z adjustment, and welded in a fixed position. The clip permits additional fine adjustment if desired.

Next, the temporary collimator is removed, and a focusing lens and the bare part of an optical fiber are actively aligned and mounted onto the optical bench. The focusing lens is positioned between the collimating lens and the input end of the fiber, so that the focusing lens receives the output of the laser and the fiber receives the output of the focusing lens. A metal ferrule around part of the fiber passing through an opening in the wall of the metal butterfly housing is welded to the housing to fixedly secure it.

In a one-lens system, the diode laser mounted on a submount is mounted onto the optical bench. Next, a focusing lens is mounted onto the optical bench, to receive the output of the laser, and the bare part of an optical fiber is mounted on the optical bench, to receive the output of the focusing lens. Typically, the focusing lens and the fiber end are actively aligned, and then fixed on the optical bench at the optimal, aligned position. A metal ferrule around part of the fiber passing through an opening in the wall of the metal butterfly housing is welded to the housing to fixedly secure it.

BRIEF DESCRIPTION OF THE DRAWINGS

Other features and advantages of the invention will become apparent upon study of the following description, taken in conjunction with the attached FIGS. 1-4.

DETAILED DESCRIPTION OF THE INVENTION

In order to optically couple a laser for generating laser light to an optical fiber, the fiber and laser must be aligned with respect to each other so that, during operation, laser light output from the laser is coupled into the input (light-receiving) end of the fiber sufficient for a laser light signal to be transmitted via the fiber. Intermediate optical components, such as lenses, that are mounted between the laser and fiber must be taken into account in the alignment process.

The present invention provides a method and laser module comprising a laser assembly and a corresponding lens assembly having an improved lens housing for providing improved alignment of a laser with respect to a fiber. Another embodiment of the invention provides an improved method and laser module for coupling a fiber to a laser in a two-lens laser system.

The terms module, system, and assembly may be used interchangeably; in the present application, the overall laser system or assembly may be referred to as a module, and various parts of the module may be referred to as assemblies. For example, a laser system is referred to as a module and may include a laser assembly and a fiber assembly. Each of these assemblies may include a housing or holder for holding the laser and fiber, respectively.

Figure 1:
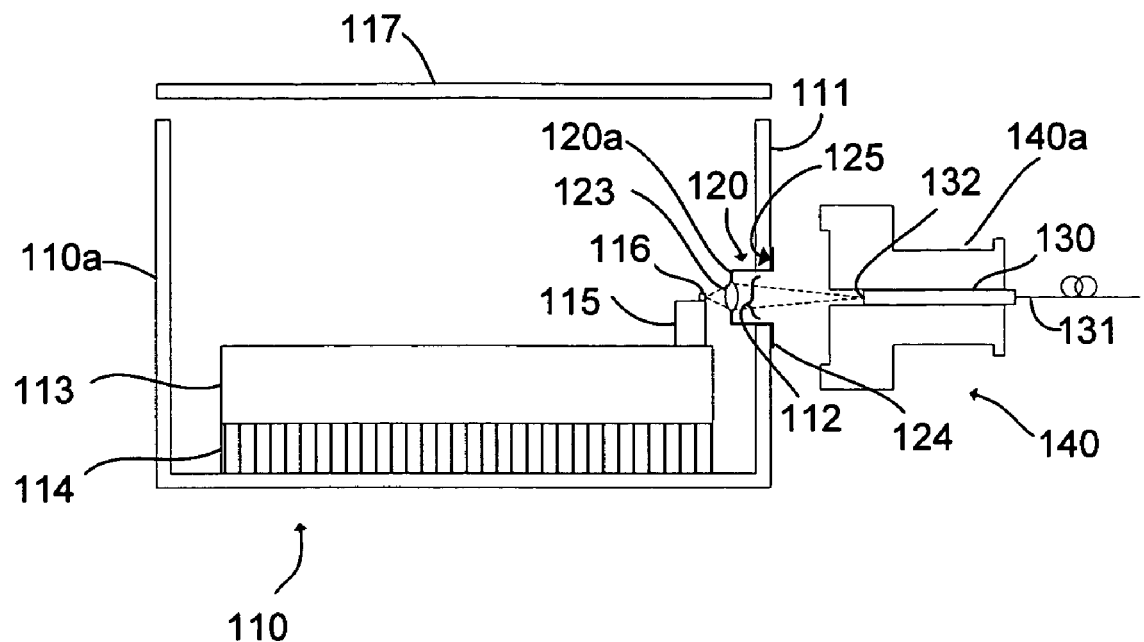
FIG. 1 is a cross-sectional view of a one-lens laser module including a laser assembly, a lens assembly, and a fiber assembly, in accordance with an embodiment of the invention.

Referring now to FIG. 1, there is shown in cross-section a one-lens laser module 100 comprising a laser assembly 110, a lens assembly 120, and fiber assembly 140. Laser assembly 110 comprises a laser housing or package 110a and other components. In an embodiment, package 110a is a butterfly package housing. Lens assembly 120 comprises a lens housing or holder 120a and lens 123. Fiber assembly 140 comprises fiber housing or holder 140a, fiber ferrule 130, and the input end 132 of fiber 131.

Laser housing 110a has a circular opening or through-hole 112 in one of its walls 111. A platform such as an optical bench 113 is mounted on a cooling means 114, which may be a TEC. On optical bench platform 113 is mounted a submount or chip carrier 115, on which is mounted a diode laser 116. Laser 116 is mounted so that its output is directed generally toward opening 112.

Laser module 100 is preferably a one-lens laser system employing a single focusing lens 123. Focusing lens 123 is mounted in a first end 121 of lens housing 120a, which is shown in further detail in FIG. 2. Lens 123 may be any suitable lens, such as an aspherical lens or ball lens.

Figure 2:
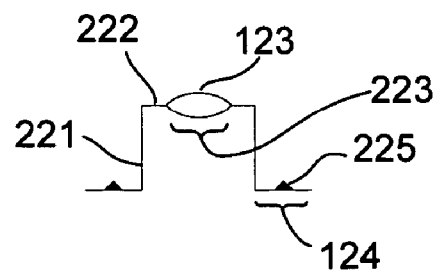
FIG. 2 is a cross-sectional view of a lens housing employed in the laser module of FIG. 1, in accordance with an embodiment of the present invention.

Referring now to FIG. 2, there is shown in cross section lens housing 120a and lens 123 of lens assembly 120 of FIG. 1 in further detail, in accordance with an embodiment of the present invention. Lens housing 120a is similar in shape to a standard TO cap, comprising substantially cylindrical side walls 221. At a "top" end of the lens housing, there is a top portion 222 joined to side walls 221 and having an opening 223 for receiving and securely holding focusing lens 123. A flange (protruding rim) portion 124 extends from the bottom end of the cylindrical side walls 221.

Flange portion 124 has a bonding means 225 on the top side of the flange (i.e., the side of the flange facing toward the top end of lens housing 120a, i.e. towards the laser housing wall 111 when the top, lens side is inserted into opening 112 from the outside of housing 110). In an embodiment, bonding means 125 is an annular resistance welding ridge. In alternative embodiments, bonding means 125 may comprise epoxy or other means of (preferably sealably) mounting lens housing 120a to laser housing 110a in opening 112.

Lens housing 120a is adapted to be inserted lens-first (at its top end) into circular opening 112 of laser package housing 110a. The outer diameter of the cylindrical walls 221 of the lens housing 120a is slightly smaller than that of the circular opening 112 so it can be fit into the opening. The outer diameter of flange 124 is larger than opening 112, so that flange 124 serves as a stop means or surface which limits the axial position of lens housing 120a when it is inserted into laser housing 110a. This prevents lens housing 120a from falling into the laser package housing 110a. When lens housing 120a is fully inserted into opening 112, ridge 225 is in contact with the outer wall 111 of the laser package housing 110a, so that resistance welding may be used to sealably secure the lens housing 120a to the laser package housing 110a at weld 125 (shown in FIG. 1). Thus, lens housing 120a can be securely mounted to opening 112 and wall 111, to fix the position of lens 123 with respect to laser 116.

Fiber housing 140a has a central opening or bore for receiving a fiber ferrule 130 inserted into its "back" side. Fiber 131, which is inside the ferrule 130, has an input end 132 which faces the "front" end of fiber housing 140a. Fiber ferrule 130 is preferably a rigid ferrule composed of metal. The front end of fiber housing 140a has mounting features for mounting to wall 111.

The position of lens housing 120a with respect to laser 116 is fixed by means of the insertion of housing 120a into opening 112 until flange 124 and its ridge 225 makes contact with wall 111 and is welded into fixed position. Therefore, lens 123 is passively (automatically) aligned with laser 116 without employing active alignment. However, because no collimating lens is employed, the fiber is preferably actively aligned after lens housing 120a is passively aligned. Fiber housing 140a is employed to permit fiber input end 132 to be independently and actively aligned with respect to laser 116 (and lens 123). Fiber housing 140a may be welded or otherwise attached to the outside of wall 111, around flange 124, once its optimal position is achieved during the active alignment process.

The dashed lines in FIG. 1 indicate the laser light output by laser 116, and focused by lens 123 into input end 132 of fiber 131. The method of alignment of laser assembly 100 is described in further detail below with respect to FIG. 5.

In an alternative embodiment, opening 112 and the outer cross-sectional profile of lens housing 120a are not circular, but are some other matched shape, such as square or oval. In this embodiment, the outer cross-sectional profile of said walls of the lens housing 120a is smaller than the opening 112 so that housing 120a can be inserted lens-first into said opening; and the flange is larger than opening 112 so that it acts as a stop and welding/mounting member. In another alternative embodiment, the laser system is a two-lens system, where lens 123 is a collimating lens instead of a focusing lens, and a focusing lens is placed somewhere between the collimating lens and the input end 132 of the fiber 131.

Figure 3:
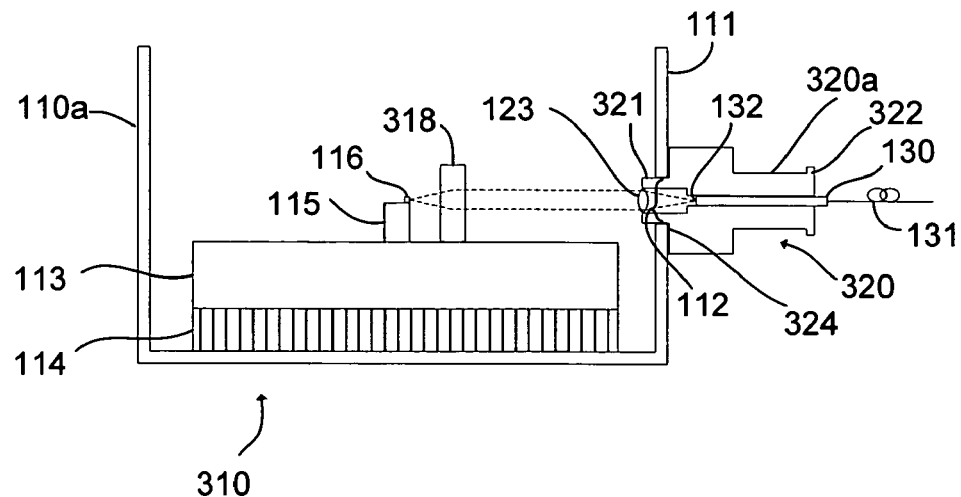
FIG. 3 is a cross-sectional view of a two-lens laser module including a laser assembly and a lens-fiber assembly, in accordance with an embodiment of the invention.

Referring now to FIG. 3, there is shown in cross-section a two-lens laser system or module 300 including a laser assembly 110 and a lens-fiber assembly 320, in accordance with an alternative embodiment of the invention. The coupling efficiency of a two-lens system may be higher than in a one-lens system.

Laser assembly 310 comprises laser housing 110a and various components including laser 116. Lens-fiber assembly 320 comprises a lens-fiber housing 320a, lens 123, fiber ferrule 130, and input end 132 of fiber 131.

Laser module 300 is a two-lens laser system employing both a collimating lens 318 and a collimator (i.e., focusing lens 123 plus the input end 132 of fiber 131 of lens-fiber assembly 320). As with module 100, in module 300 a platform 113 is mounted on a TEC 114. On optical bench platform 113 is mounted a submount 115, on which is mounted a diode laser 116. Also mounted on platform 113 is collimating lens 318. Laser 116 is mounted so that its output is directed generally toward collimating lens 318, the output of which is directed generally toward opening 112. The dashed lines in FIG. 3 indicate the laser light output by laser 116, collimated by lens 318, and focused by lens 123 into input end 132 of fiber 131.

Focusing lens 123 is passively pre-aligned with the fiber via lens-fiber housing 320a. The focusing lens 123 is installed into a lens bore in the first end 321 of the housing 320a. It may be installed into lens-fiber housing 320a with any suitable means, such as being press-fitted therein. Housing 320a therefore comprises a means for passively aligning and mounting lens 123 and input end 132 of fiber 131 with respect to each other.

First end 321 serves as the mating and passive alignment means of lens housing 320a, to mate with corresponding alignment and mounting features or means in laser housing 110a, to-wit, opening 112. An initial section of first end 321 is adapted to be inserted into circular opening 112 of laser package housing 110a. The outer diameter of the cylindrical walls of this initial section of the first end 321 of lens-fiber housing 320a is slightly smaller than that of the circular opening 112 so it can be fit into the opening. A portion behind this first section has a larger diameter, defining a flange surface which serves as a stop means which limits the axial position of lens housing 320a when it is inserted into laser housing 110a. This prevents lens housing 320a from falling into the laser package housing 110a. When lens housing 320a is fully inserted into opening 112, the flange or stop surface is in contact with the outer wall 111 of the laser package housing 110a. Welding or other suitable technique may be used to sealably secure the lens-fiber housing 320a to the laser package housing 110a. The flange surface may have, for example, an annular resistance welding ridge, to permit lens-fiber housing 320a to be welded to wall 111. Thus, lens housing 320a can be securely mounted to opening 112 and wall 111, to fix the position of lens 123 with respect to laser 116.

In an alternative embodiment, focusing lens 123 need not be mounted at the very end of first end 121 of lens-fiber housing 320a, as depicted in FIG. 3. It may be mounted, for example, more toward the center of lens-fiber housing 320a.

Figure 4:
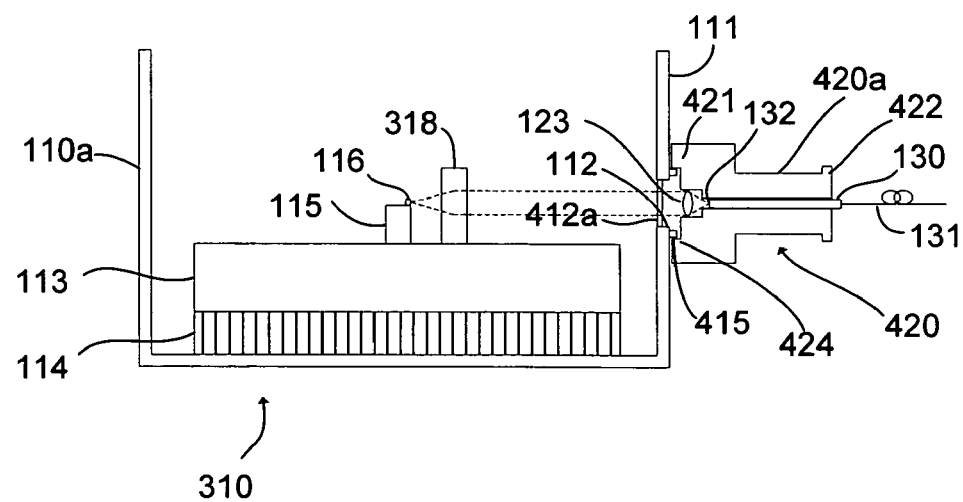
FIG. 4 is a cross-sectional view of a two-lens laser module including a laser assembly, a lens assembly, and a fiber assembly, in accordance with an alternative embodiment of the invention.

Referring now to FIG. 4, there is shown in cross-section a two-lens laser module or system 400 including a laser assembly 110 and a lens-fiber assembly 420, in accordance with an alternative embodiment of the invention. Laser module 400 is similar to module 300 in that it is a two-lens laser system employing both a collimating lens 318 and a collimator (focusing lens 123 plus the input end 132 of fiber 131), and in that focusing lens 123 is passively pre-aligned with the fiber via lens-fiber housing 420a. However, in this embodiment, in opening 112 there is a window 412a (e.g., a glass window), and lens-fiber housing 420a is designed to be mounted to the outside of wall 111 of laser housing 120a, around opening 112, rather than being inserted into opening 112. Because window 412a is employed, lens-fiber housing 420a need not be sealably secured to wall 111, but only fixedly secured, since window 412a provides the seal.

In an embodiment, one or more passive alignment features on the outside of the laser housing wall near the laser housing wall opening 112 may be employed to assist in the passive alignment and mounting of lens-fiber housing 420a with respect to laser housing 110a. In an embodiment, as illustrated in FIG. 4, an alignment feature such as an annular ridge 415 around opening 112, on the outside of wall 111, may be employed, along with a corresponding cylindrical mating feature 424 at the first end 421 of lens-fiber housing 420a which are complementary to the passive alignment features on the wall to permit the lens-fiber housing to be passively aligned and mounted to said laser housing wall around said opening.

In this case the cylindrical mating feature 424 at first end 421 would have an inner diameter just slightly larger than the outer diameter of annular mating ridge 415, so that it could fit around it and be secured to it with any suitable fastening means, such as epoxy, solder, brazing, or welding. Alternatively, cylindrical mating feature 424 could be adapted to fit inside protruding annular ridge 415. Other alignment features, stops, grooves, and the like could also be employed to assist in the passive alignment and mounting of lens-fiber housing 420a with respect to laser housing 110a. Thus, while in module 300 opening 112 serves as a passive alignment feature to help passively align first end 321 of lens housing 320a, in alternative embodiments such as module 400, alignment features other than an opening 112 may be employed.

The method of alignment of laser modules 300 and 400 is described in further detail below with respect to FIG. 6.

In an alternative embodiment, window 412a is absent from opening 112, as in assembly 300. In this case lens-fiber housing 420a is preferably adapted to be sealably secured to wall 111. In another alternative embodiment, no alignment features are employed (e.g., ridge 415 is absent). In this case, lens-fiber housing 420a is actively aligned and mounted to wall 111 around opening 112 by any suitable method.

Figure 5:
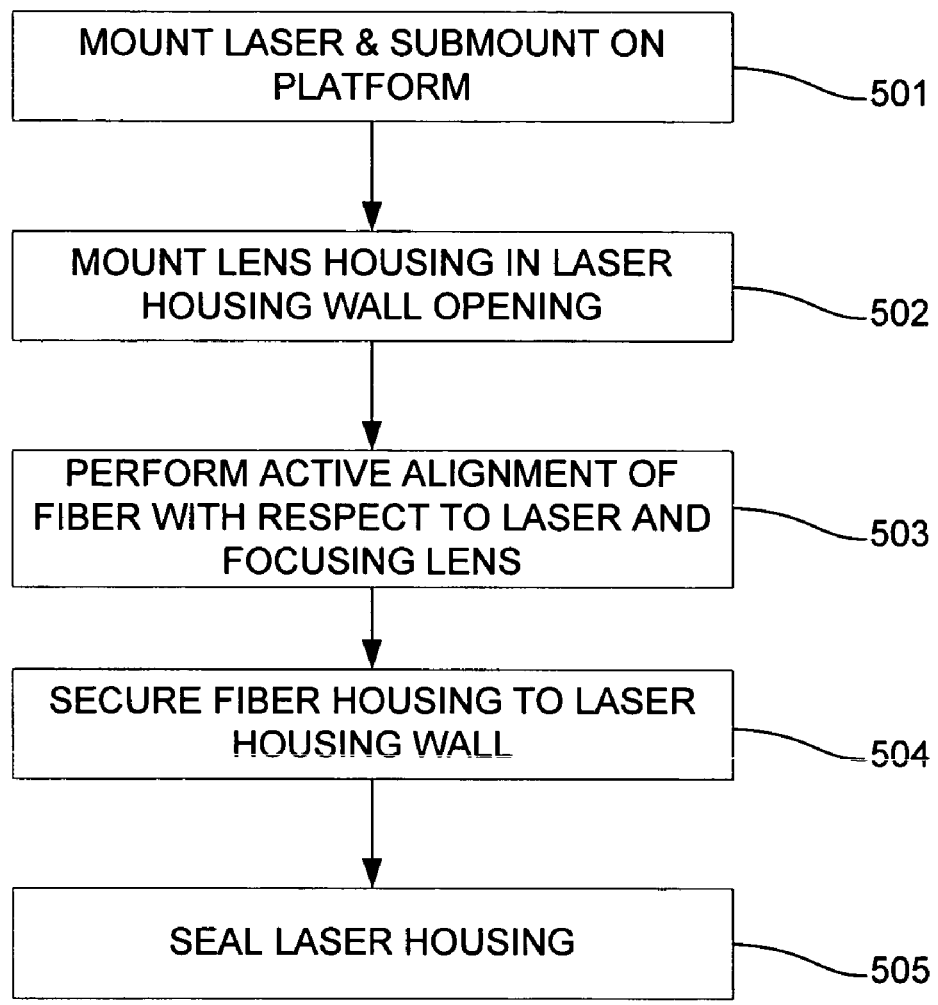
FIG. 5 is a flow chart illustrating the method of aligning a one-lens laser system such as the module of FIG. 1, in accordance with an embodiment of the invention.

Referring now to FIG. 5, there is shown a flow chart illustrating a method 500 of aligning a one-lens laser system such as laser module 100, in accordance with an embodiment of the invention. First, submount or chip carrier 115 containing laser 116 is mounted in laser housing 110a, preferably on platform 113, so that its output is directed towards opening 112 (step 501). Lens housing 120a, comprising focusing lens 123 installed into the front or top end thereof, is inserted into opening 112 in the wall 111 of the metal butterfly housing 110a at its top (lens) end until flange 124 butts up against the outer surface of laser housing wall 111; it is then fixedly secured to wall 111 by resistance welding at ridge 225 (step 502). Lens 123 is thus not actively aligned with respect to laser 116. At some previous point fiber ferrule 130 containing an end of fiber 131 is inserted into the central ferrule opening of fiber housing 140a. It is preferably spot welded or otherwise secured to lens-fiber housing 120a. The fiber assembly 140 comprising fiber housing 140a and fiber 130 is then actively aligned (step 503). After alignment, fiber housing 140a is fixedly secured to its current, aligned position around opening 112 on the outside of wall 111 at its front end (step 504). This secures the position of fiber assembly 140 (and therefore fiber input end 131) with respect to laser housing 110 and lens housing 120a (and therefore with respect to laser 116 and lens 123). Fiber housing 140a may be secured at its first or front end to wall 111 with any suitable fastening means, such as epoxy, solder, or welding. Finally, the top wall 117 of laser housing 110 is sealed into place (step 505), or it may be done at an earlier point in the process.

Figure 6:
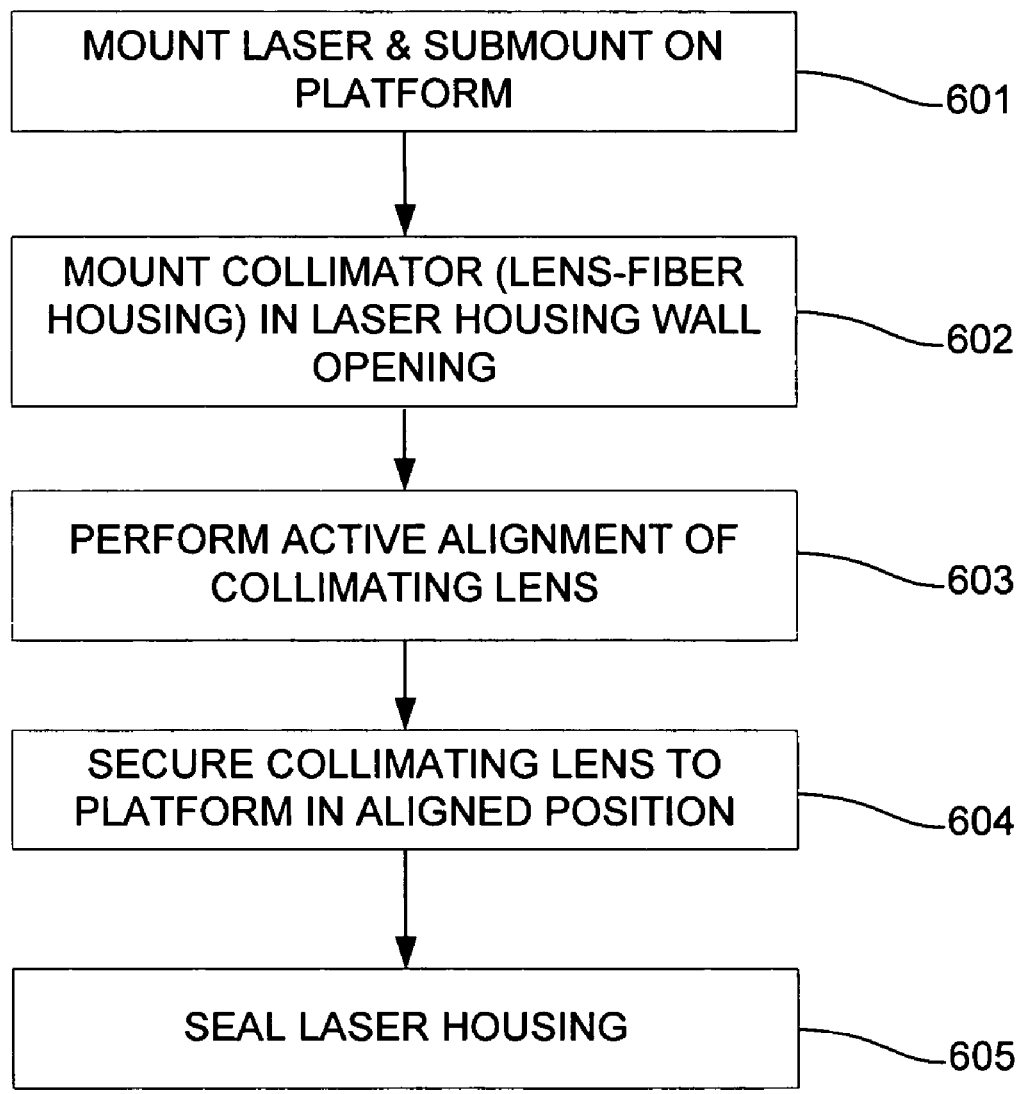
FIG. 6 is a flow chart illustrating the method of aligning a two-lens laser system such as the modules of FIG. 3 or 4, in accordance with an embodiment of the invention.

Referring now to FIG. 6, there is shown a flow chart illustrating a method 600 of aligning (forming an aligned) two-lens laser system such as modules 300 or 400, in accordance with an embodiment of the invention. First, the laser 116 is mounted in laser housing 110a so that its output is directed toward the opening 112. In a preferred embodiment, laser 116 is mounted on submount 115, which is mounted to the platform 113 (step 601). Lens-fiber housing 320a, 420a, comprising a pre-assembled collimator (i.e., focusing lens 123 combined with a fiber input end 132) is positioned with respect to opening 112 to receive light from collimating lens 318. Lens-fiber assembly 320, 420 is assembled by installing lens 123 into the lens opening or bore, and by inserting fiber ferrule 130 containing the light-receiving input end 132 of the fiber 131 into the bore at the second end of the lens-fiber housing 320a, 420a, to bring the light-receiving input end 132 of the fiber 131 into a predetermined position with respect to lens 123.

In an embodiment, lens-fiber housing 320a, 420a is first positioned using passive alignment features, namely (in the case of lens-fiber housing 320a), by inserting it into opening 112 in the wall 111 of the metal butterfly housing 110, or (in the case of lens-fiber housing 420a) by positioning lens-fiber housing 420a around alignment features 415, i.e., mounting the lens-fiber housing to the laser housing wall around the laser housing wall opening by matching the mating features 424 to alignment features 415 (step 602). That is, in step 602, the lens-fiber housing is mounted to opening 112 in the wall 111 of the metal butterfly housing 110a. Active alignment is not yet performed at this point.

Collimating lens 318 is positioned between laser 116 and lens 123 and actively aligned, i.e. an optimal, "aligned" position is determined at which light from laser 116 will adequately couple into fiber input end 132 (step 603). Collimating lens 313 is then secured at the aligned position by means of a clip which permits x, y, z adjustment, e.g. by welding (step 604). Finally, the top wall of laser housing 110a (shown in FIG. 1) is sealed into place (step 605), or it may be done at an earlier point in the process.

Note that the same collimator of lens-fiber housing 320a, 420a that is used when aligning collimating lens 318 serves as the collimator for the final laser module. This avoids having to actively align (and mount inside the housing) the focusing lens and the fiber, thus avoiding two separate active alignment steps.

Dimensions shown in the Figures are not necessarily to scale.

The present invention, therefore, is well adapted to carry out the objects and attain the ends and advantages mentioned, as well as others inherent therein. While the invention has been depicted and described and is defined by reference to particular preferred embodiments of the invention, such references do not imply a limitation on the invention, and no such limitation is to be inferred. The invention is capable of considerable modification, alteration and equivalents in form and function, as will occur to those ordinarily skilled in the pertinent arts. The depicted and described preferred embodiments of the invention are exemplary only and are not exhaustive of the scope of the invention. Consequently, the invention is intended to be limited only by the spirit and scope of the appended claims (if any), giving full cognizance to equivalents in all respects.

What is claimed is:

1. A method for forming a laser module having a laser optically coupled with an optical fiber via a collimating lens and a focusing lens, the method comprising the steps of:
   (a) mounting said laser in a laser housing so that its laser light output is directed toward a laser housing wall opening in a laser housing wall of the laser housing;
   (b) providing a lens-fiber housing having a focusing lens installed in a first end thereof and a light-receiving input end of the fiber disposed in a bore at a second end thereof, wherein the focusing lens and input end of the fiber form a collimator, and wherein the focusing lens is passively pre-aligned with the fiber via the lens-fiber housing;
   (c) mounting the lens-fiber housing from the outside of said laser housing to the laser housing wall to receive collimated light transmitted from inside the laser housing through said laser housing wall opening; and
   (d) actively aligning the collimating lens in the laser housing, between the laser and the laser housing wall opening, to determine an aligned position and securing the collimating lens in the laser housing at said aligned position.

2. The method of claim 1, further comprising the step of sealing the laser housing.

3. The method of claim 1, wherein step (a) comprises the steps of mounting an optical bench on a base of the laser housing, mounting a laser submount on said base, and mounting the laser on the laser submount, wherein step (d) comprises the step of securing the collimating lens at the aligned position on said optical bench.

4. The method of claim 1, wherein step (b) comprises the step of installing the lens in a lens bore in the first end of the lens-fiber housing and inserting a fiber ferrule containing the light-receiving input end of the fiber the bore at the second end of the lens-fiber housing to bring the light-receiving input end of the fiber into a predetermined position with respect to the lens.

5. The method of claim 1, wherein:

the lens-fiber housing comprises a first section at the first end having a cross-sectional profile smaller than said laser housing wall opening so that said lens-fiber housing can be inserted at its first end into said laser housing wall opening;

the lens-fiber housing comprises a second section at the first end behind said first section, said section having a cross-sectional profile larger than said laser housing wall opening to limit axial insertion of the lens-fiber housing into said laser housing wall opening; and step (c) comprises the steps of inserting the first section of the first end of the lens-fiber housing into said laser housing wall opening until said second section prevents further insertion of the lens-fiber housing into said opening and securing the lens-fiber housing to the laser housing wall at said inserted position.

6. The method of claim 5, wherein the laser housing wall opening is substantially circular and the first section of the first end of the lens-fiber housing is substantially cylindrical and has an outer diameter slightly smaller than the inner diameter of said laser housing wall opening.

7. The method of claim 6, wherein the lens-fiber housing further comprises a substantially annular resistance welding ridge on a flange surface defined between said first and second sections thereof, wherein step (c) comprises the step of securing the lens-fiber housing to the laser housing wall at said inserted position by resistance welding the lens-fiber housing to the outside surface of said laser housing wall, around said laser housing wall opening, with said resistance welding ridge.

8. The method of claim 1, wherein:

the laser housing comprises one or more passive alignment features on the outside of the laser housing wall near said laser housing wall opening;

the lens-fiber housing comprises at its first end mating features complementary to said passive alignment features to permit the lens-fiber housing to be passively aligned and mounted to said laser housing wall around said opening; and step (c) comprises the steps of mounting the lens-fiber housing to said laser housing wall around the laser housing wall opening by matching said mating features to said alignment features.

9. The laser module produced in accordance with the method of claim 1.

10. The laser module produced in accordance with the method of claim 2.

11. The laser module produced in accordance with the method of claim 3.

12. The laser module produced in accordance with the method of claim 4.

13. The laser module produced in accordance with the method of claim 5.

14. The laser module produced in accordance with the method of claim 6.

15. The laser module produced in accordance with the method of claim 7.

16. The laser module produced in accordance with the method of claim 8.

* * * * *